US008880764B2

(12) United States Patent
Tsirkin et al.

(10) Patent No.: US 8,880,764 B2
(45) Date of Patent: Nov. 4, 2014

(54) PESSIMISTIC INTERRUPT AFFINITY FOR DEVICES

(75) Inventors: Michael S. Tsirkin, Yokneam Yillit (IL); Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 571 days.

(21) Appl. No.: 13/221,590

(22) Filed: Aug. 30, 2011

(65) Prior Publication Data
US 2013/0054861 A1 Feb. 28, 2013

(51) Int. Cl.
*G06F 13/24* (2006.01)
(52) U.S. Cl.
CPC ....................................... *G06F 13/24* (2013.01)
USPC ............................ 710/260; 710/266; 718/107
(58) Field of Classification Search
USPC ................................ 710/260–269; 718/1, 107
See application file for complete search history.

(56) References Cited

U.S. PATENT DOCUMENTS

| 5,428,799 | A | * | 6/1995 | Woods et al. | 710/266 |
| 2006/0212607 | A1 | * | 9/2006 | Riethmuller | 710/6 |
| 2008/0162762 | A1 | * | 7/2008 | Neiger et al. | 710/261 |
| 2010/0274940 | A1 | * | 10/2010 | Ahmad et al. | 710/267 |
| 2011/0202699 | A1 | * | 8/2011 | van Riel | 710/267 |
| 2013/0054860 | A1 | * | 2/2013 | Tsirkin et al. | 710/266 |

* cited by examiner

*Primary Examiner* — Glenn A Auve
(74) *Attorney, Agent, or Firm* — Lowenstein Sandler LLP

(57) ABSTRACT

A computing apparatus identifies that a first physical processor of a host has forwarded information regarding a device interrupt for a device to a second physical processor executing at least one of a virtual processor that controls the device or an application thread that controls the device. After identifying that the first physical processor has forwarded the information regarding the device interrupt to the second physical processor and in response to determining that one or more update criteria have been satisfied, the computing apparatus updates at least one of the device or an interrupt controller to cause at least one of the device or the interrupt controller to send future device interrupts for the device to the second physical processor.

22 Claims, 10 Drawing Sheets

PESSIMISTIC INTERRUPT AFFINITY FOR DEVICES

TECHNICAL FIELD

Embodiments of the present invention relate to device interrupts, and more specifically to managing assignment of device interrupts to processing units.

BACKGROUND

Modern computer systems may have multiple processors. A computer system having multiple processors may be connected to multiple devices, each of which may generate device interrupts to communicate information to the computer system. The computer system includes a scheduler that attempts to balance work load between the processors. As a result, schedulers frequently assign interrupts to one processing device, and handle other work on remaining processing devices.

A virtual machine running on a host computer system that has multiple processors may have multiple virtual processors. Each of the virtual machine's virtual processors runs on a specific hardware processor of the host. A virtual machine includes its own scheduler, which assigns specific virtual processors to handle device interrupts from one or more devices. It is often the case that the virtual processor that the virtual machine's scheduler has assigned to handle device interrupts for a device runs on a first hardware processor that is different from a second hardware processor that the host's scheduler has assigned to handle device interrupts for that device. As a result, the second hardware processor receives interrupts for the device, and then generates inter-processor interrupts to forward the device interrupts to the first processing device. This can introduce overhead for the processing of device interrupts.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for reducing a frequency of inter-processor interrupts (IPIs) or other inter-processor communications caused by device interrupts. In one embodiment, a multiprocessor host machine hosts a virtual machine that includes multiple virtual processors. A device or an interrupt controller is configured to send device interrupts for the device to a first physical processor of the host machine. A virtual processor (or application thread) runs on a second physical processor of the host machine and is configured by a guest to control the device. In response to receiving a device interrupt for the device, the first physical processor generates an inter-processor interrupt (or other inter-processor communication) to forward the device interrupt (or information regarding the device interrupt) to the second physical processor. The host machine identifies that the inter-processor communication has been generated, and determines whether an update criterion has been satisfied. In response to determining that an update criterion has been satisfied, the host machine updates the device and/or the interrupt controller to cause the device and/or the interrupt controller to send future device interrupts for the device to the second physical processor. Therefore, no inter-processor interrupts (or other inter-processor communications) will be generated in response to future device interrupts for the device. This can reduce an overhead associated with the device interrupt, and improve response times.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
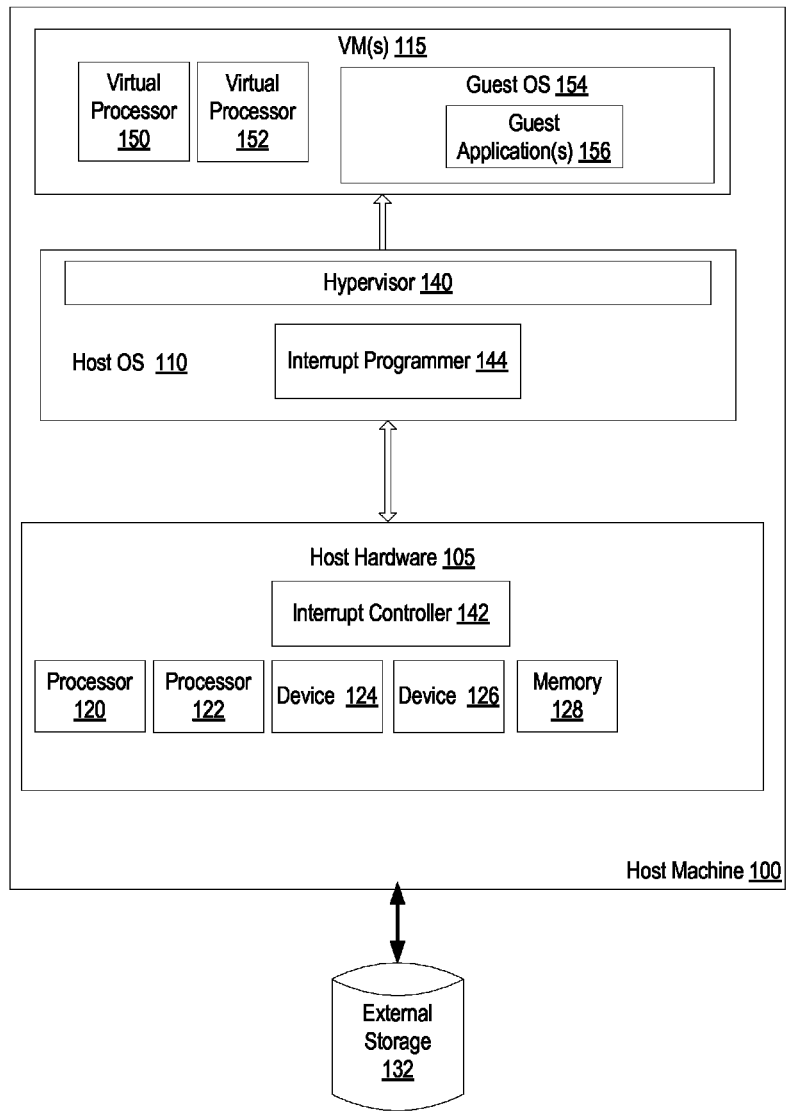
FIG. 1 is a block diagram that illustrates an embodiment of a computer system that hosts one or more virtual machines.

FIG. 1 is a block diagram that illustrates an embodiment of a computer system (referred to herein as a host machine 100) that hosts one or more virtual machines (VMs) 115. The host machine 100 may be a rackmount server, a workstation, a desktop computer, a notebook computer, a tablet computer, a mobile phone, a palm-sized computing device, a personal digital assistant (PDA), etc. The host machine 100 includes host hardware 105, which includes multiple processors 120, 122, multiple devices 124, 126, memory 128, and other hardware components. The memory 124 may include volatile memory devices (e.g., random access memory (RAM)), non-volatile memory devices (e.g., flash memory), and/or other types of memory devices. The host hardware 105 may also be coupled to external storage 155 via a direct connection or a local network. The host machine 100 may be a single machine or multiple host machines arranged in a cluster.

The term "processor" as used herein refers to a single processor core. Each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one embodiment, processors 120, 122 that are processor cores of the same integrated circuit share a socket. Processors that share a socket may communicate with one another more efficiently than processors that do not share a socket.

In one embodiment, the processors 120, 122 are arranged in one or more non-uniform memory access (NUMA) nodes. Processors that are components of the same NUMA node may share the same memory bus. In contrast, processors that are components of different NUMA nodes use different memory buses. Therefore, processors that are components of the same NUMA node may communicate with one another more quickly than processors that are components of different NUMA nodes. A NUMA node may include multiple sockets. Communications between processors that share a socket may be more efficient than communications between processors that share the same NUMA node but that are on different sockets.

Each of the devices 124, 126 may be a physical device that is internal or external to the host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc. Devices 124, 126 communicate with the host machine (e.g., notify the host machine 100 of events) by generating device interrupts.

In one embodiment, devices 124, 126 send device interrupts to an interrupt controller 142 (e.g., an advanced programmable interrupt controller (APIC)) on the host machine 100 via a physical interrupt line. The interrupt controller 142 is a device that is a component of the host hardware 105. The interrupt controller 142 receives interrupts and determines which processors 120, 122 should handle the interrupts. The interrupt controller 142 then sends the device interrupts to the determined processors. For example, interrupt controller 142 may receive an interrupt from device 124 and send the interrupt to processor 120.

In another embodiment, devices 124, 126 generate message signaled interrupts (MSIs). A message signaled interrupt does not use a physical interrupt line. Instead, the device 124, 126 sends the device interrupt in-band over some communications medium, such as a computer bus. Message signaled interrupts designate a processor to handle the interrupt. Accordingly, MSIs bypass the interrupt controller 142. Some devices 124, 126 may send MSIs, while other devices 124, 126 may generate standard or legacy device interrupts. Additionally, a single device may generate both MSIs and standard device interrupts.

The host machine 100 includes a hypervisor 140 (also known as a virtual machine monitor (VMM)). In one embodiment (as shown) hypervisor 140 is a component of a host operating system 110. Alternatively, the hypervisor 140 may run on top of a host OS 110, or may run directly on host hardware 105 without the use of a host OS 110.

The hypervisor 140 manages system resources, including access to memory 128, devices 124, 126, secondary storage, and so on. The hypervisor 140, though typically implemented in software, may emulate and export a bare machine interface (host hardware 105) to higher level software. Such higher level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115, which may provide the same or different abstractions to various guest software (e.g., guest operating system, guest applications, etc.).

The host machine 100 hosts any number of virtual machines (VM) 115 (e.g., a single VM, one hundred VMs, etc.). A virtual machine 115 is a combination of guest software that uses an underlying emulation of the host machine 100 (e.g., as provided by hypervisor 140). The guest software may include a guest operating system 154, guest applications 156, guest device drivers (not shown), etc. Virtual machines 115 can be, for example, hardware emulation, full virtualization, para-virtualization, and operating system-level virtualization virtual machines. The virtual machines 115 may have the same or different guest operating systems 154, such as Microsoft® Windows®, Linux®, Solaris®, etc.

Each VM 115 may include multiple virtual processors 150, 152. Each virtual processor 150, 152 of a VM 115 runs on a specific processor 120, 122 of the host machine 100. The hypervisor 140 may control which virtual processors 150, 152 run on which hardware processors 120, 122. For example, virtual processor 150 may run on processor 120, and virtual processor 152 may run on processor 122.

The host OS 110 may assign specific processors 120, 122 to handle interrupts for specific devices 124, 126. Additionally, the guest OS 154 of the VM 115 may assign specific virtual processors 150, 152 to handle interrupts for specific devices 124, 126. Moreover, the hypervisor 140 assigns each virtual processor 150, 152 to run on a specific hardware processor 120, 122.

In one example, the host machine assigns processor 120 to handle device interrupts for device 124, the hypervisor 140 assigns virtual processor 152 to run on processor 122, and the guest assigns virtual processor 152 to handle device interrupts for the device 124. Therefore, the virtual processor that the guest has assigned to handle device interrupts for a specific device may run on a different physical processor than was assigned to handle device interrupts for the device. In this situation, processor 120 would receive an interrupt for device 124. Processor 120 would then determine that virtual processor 152 is assigned to control the device and that virtual processor 152 runs on processor 122. Processor 120 would generate an inter-processor interrupt (IPI) to forward the device interrupt for device 124 to processor 122 so that virtual processor 152 running on processor 122 can act on the device interrupt. Generation of the IPI introduces inefficiencies. If the guest virtual processor that handles interrupts for a device runs on the same host processor that handles interrupts for the device, the cost of forwarding the interrupt between the host processor and the guest processor is much reduced, and the system becomes more efficient.

In one embodiment, interrupt programmer 144 programs a device 124, 126 and/or the interrupt controller 142 to cause the device 124, 126 and/or interrupt controller 142 to send device interrupts to a specified processor 120, 122. The specified processor 120, 122 may be the processor on which a virtual processor 150, 152 that handles device interrupts for that particular device 124, 126 executes. Since the overhead of communication regarding a device interrupt for a device is often greater than the overhead of actually processing the device interrupt, collocating the processing of the interrupt to a processor 120, 122 that hosts a virtual processor 150, 152 that controls the device 124, 126 can result in significant efficiency gains.

The interrupt programmer 144 may program the device 124, 126 and/or interrupt controller 142 in response to one or more update criteria. In one embodiment, the interrupt programmer 144 keeps track of a number of IPIs that have been generated based on device interrupts for each device 124, 126. When a threshold number of IPIs have been generated based on device interrupts for a particular device 124, 126, that device and/or the interrupt controller 142 may be updated to send future device interrupts to a different processor. In another embodiment, the interrupt programmer 144 maintains a list (or other data structure) of devices that are controlled by each virtual processor 150, 152. When the hypervisor 140 moves a virtual processor 150, 152 to a new hardware processor 120, 122, then the interrupt programmer 144 may update the devices that are controlled by that virtual processor so that the devices will send MSIs to the new hardware processor 120, 122. Additionally, or in the alternative, the interrupt programmer 144 may update the interrupt controller 142 to send interrupts for those devices 124, 126 to the new hardware processor 120, 122.

Figure 2:
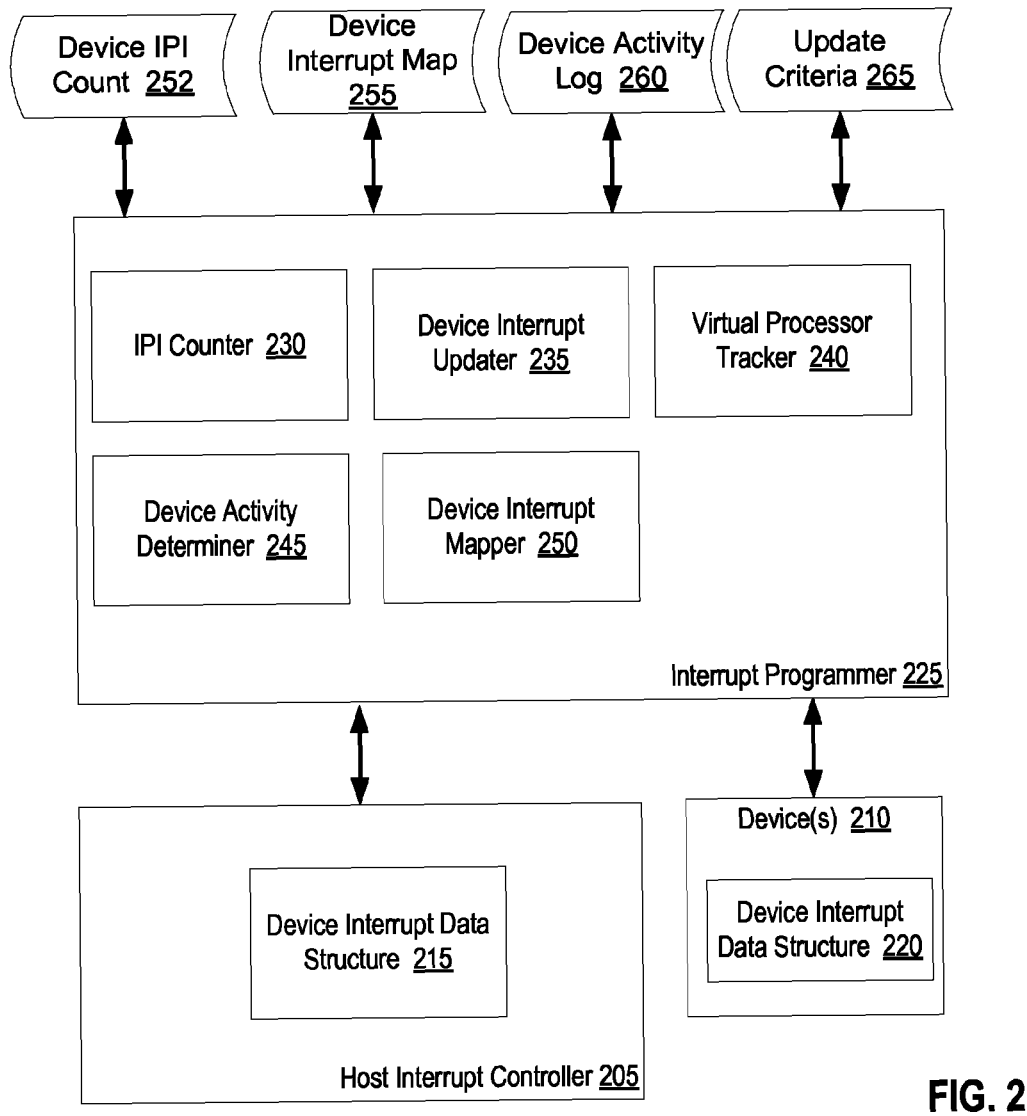
FIG. 2 is a block diagram of an interrupt programmer, in accordance with one embodiment of present invention.

FIG. 2 is a block diagram of an interrupt programmer 225, in accordance with one embodiment of present invention. In one embodiment, interrupt programmer 225 corresponds to interrupt programmer 144 of FIG. 1. As described with reference to FIG. 1, each virtual machine may include multiple virtual processors, each or which runs on a different hardware processor. Interrupt programmer 225 controls which hardware processors will handle device interrupts for specific devices. This may be based, for example, on a mapping of devices to virtual processors and based on a mapping of the virtual processors to physical processors.

Interrupt programmer 225 includes a device interrupt updater 235 that may change a configuration of a host interrupt controller 205 to cause the host interrupt controller 205 to send device interrupts for a specific device or devices to a specified processor. In one embodiment, device interrupt updater 235 modifies or updates a device interrupt data structure 215 of the host interrupt controller 205 to cause the host interrupt controller to send device interrupts for a device to a new host processor. The device interrupt data structure 215 may be a list, table, or other data structure.

Device interrupt updater 235 may also change a configuration of a device 210 to cause the device to send MSIs to a specified host processor. In one embodiment, the device 210 includes a device interrupt data structure 220, which may be a configuration file or other data structure that identifies a processor to send MSIs to.

In one embodiment, interrupt programmer 225 includes an IPI counter 230. IPI counter 230 maintains a device IPI count 252 for each device 210. The device IPI count 252 is a count of a number of IPIs that have been generated based on device interrupts of a device 210. The device IPI count 252 may be an absolute count or may be a percentage of total interrupts (e.g., IPIs for device divided by total device interrupts). Alternatively, the IPI count may be an IPI frequency (e.g., IPIs/second, IPIs/millisecond, etc.). A separate IPI count 252 may be maintained for each device.

After the device IPI count 252 for a particular device is updated, IPI counter 230 may compare the IPI count to one or more IPI thresholds, which may be maintained in update criteria 265. Examples of IPI thresholds include an absolute IPI count threshold (e.g., 1 IPI, 10 IPIs, etc.), an IPI frequency threshold (e.g., 5 IPIs/second), and an IPI ratio threshold (e.g., 1 IPI/100 interrupts). Additionally, there may be different IPI thresholds for different processor architectures and/or relationships. For example, the update criteria 265 may include a NUMA node criterion that is associated with a first IPI threshold. The update criteria 265 may also include a different socket criterion that is associated with a second IPI threshold and/or a same socket criterion that is associated with a third IPI threshold. The first IPI threshold may be lower than the second IPI threshold, which may be lower than the third IPI threshold. The IPI thresholds may be set such that overhead associated with updating the interrupt controller and/or the device is lower than overhead associated with generating IPIs.

If any of the IPI thresholds are satisfied, then IPI counter 230 directs device interrupt updater 235 to update the host interrupt controller 205 for a device and/or to update a device 210. When the device interrupt updater 235 updates the host interrupt controller for a device and/or updates a device, the IPI counter 230 may reset the IPI count 252 for that device. Accordingly, the interrupt programmer 225 may track both migration of virtual processors between host processors and reassignment of device control to new virtual processors based on IPIs.

In one embodiment, interrupt programmer 205 includes a virtual processor tracker 240 and a device interrupt mapper 250. Virtual processor tracker 240 tracks the mapping between virtual processors and host processors. This mapping may be maintained by a hypervisor.

Device interrupt mapper 250 keeps track of virtual processors that control devices. In one embodiment, device interrupt mapper 250 maintains a device interrupt map 255. The device interrupt map 255 associates devices with virtual processors that control those devices.

When virtual processor tracker 240 identifies that a virtual processor has migrated to a new host processor, virtual processor tracker 240 uses the device interrupt map 255 to determine what devices are controlled by that virtual processor. Virtual processor tracker 240 then directs device interrupt updater 235 to update the host interrupt controller 205 for those devices 210 controlled by the virtual processor and/or to update the devices 210. The update causes the devices and/or host interrupt controller 205 to send device interrupts for the devices to the new host processor. Additionally, when device interrupt mapper 250 determines that control of a device has transferred to a new virtual processor, device interrupt mapper 250 may direct device interrupt updater 235 to update the host interrupt controller 205 and/or the device.

In one embodiment, interrupt programmer 225 includes a device activity determiner 245 that maintains a device activity log 260. The device activity log 260 may include information on recent device interrupts generated by each device. Before device interrupt updater 235 updates the host interrupt controller 205 and/or the devices 210, device interrupt updater may check the device activity log 260 and compare device activity levels to a device activity threshold, which may be an update criterion 265. The device activity threshold may be a simple time based threshold. For example, any devices that generated interrupts in the last 5 seconds may satisfy such a device activity threshold. Alternatively, the device activity threshold may be a frequency threshold. For example, a device may satisfy the threshold if it was used at least twice within a 2 second period. Multiple device activity thresholds may be used. Device interrupt updater 235 may then reprogram the host interrupt controller 205 with regards to devices that meet the device activity threshold (or thresholds). Therefore, no overhead may be generated reprogramming devices that are inactive.

Figure 3A:
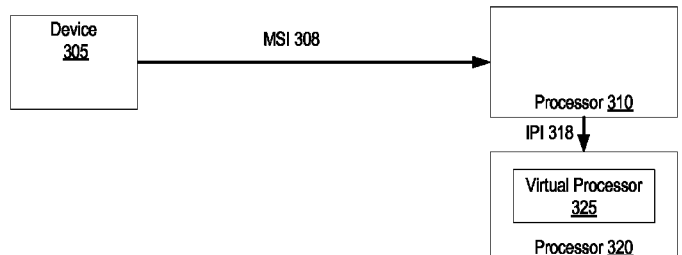
FIG. 3A illustrates the propagation of an interrupt before a device has been reprogrammed.
Figure 3B:
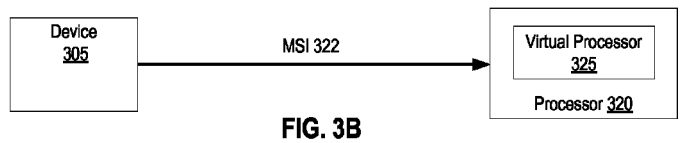
FIG. 3B illustrates the propagation of an interrupt after a device has been reprogrammed.

FIGS. 3A-3D illustrate propagation of interrupts within a computer system, in accordance with embodiments of the present invention. FIG. 3A illustrates the propagation of an interrupt before a device 305 has been reprogrammed. In FIG. 3A, a device 305 sends a message signaled interrupt (MSI) 308 to a processor 310. The processor 310 generates an IPI 318 to send the interrupt to processor 320. Processor 320 then forwards the interrupt to virtual processor 325. FIG. 3B illustrates the propagation of an interrupt after the device 305 has been reprogrammed. In FIG. 3B, the device 305 sends an MSI 322 to processor 320. Processor 320 then forwards the interrupt to virtual processor 325 without generating an IPI.

Figure 3C:
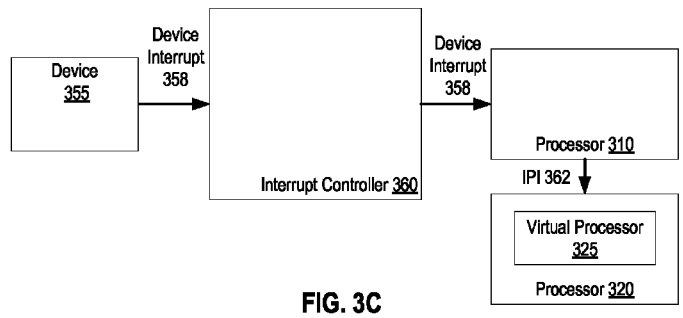
FIG. 3C illustrates the propagation of an interrupt before an interrupt controller has been reprogrammed.
Figure 3D:
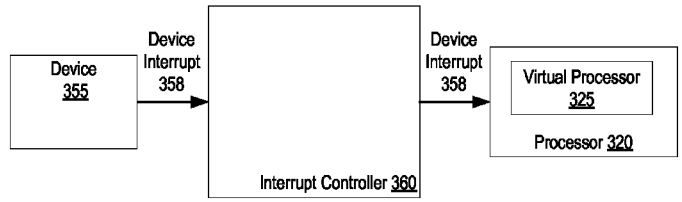
FIG. 3D illustrates the propagation of an interrupt after an interrupt controller has been reprogrammed.

FIG. 3C illustrates the propagation of an interrupt before an interrupt controller 360 has been reprogrammed. In FIG. 3C, a device 355 sends an interrupt 358 to an interrupt controller 360. The interrupt controller 360 then forwards the interrupt 358 to processor 310. The processor 310 generates an IPI 362 to send the interrupt to processor 320. Processor 320 then forwards the interrupt to virtual processor 325. FIG. 3D illustrates the propagation of an interrupt after the interrupt controller 360 has been reprogrammed. In FIG. 3D, the device 355 sends an an interrupt to interrupt controller 360. Interrupt controller 360 forwards the interrupt 358 to processor 320. Processor 320 then forwards the interrupt to virtual processor 325 without generating an IPI.

Figure 4:
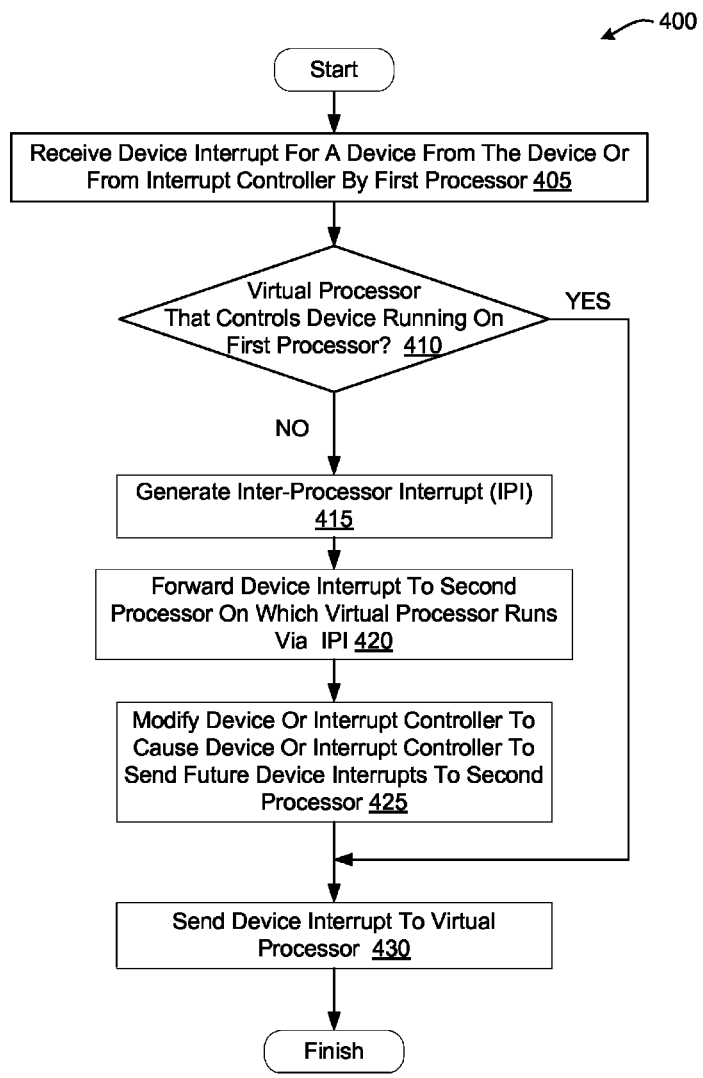
FIG. 4 is a flow diagram illustrating one embodiment of a method for performing pessimistic mapping of device interrupts to processors.

FIG. 4 is a flow diagram illustrating one embodiment of a method 400 for performing pessimistic mapping of device interrupts to processors. The method 400 may be performed by a computer system that may comprise hardware (e.g., circuitry, dedicated logic, programmable logic, microcode, etc.), software (e.g., instructions run on a processing device to perform hardware simulation), or a combination thereof. In one embodiment, at least some operations of the method 400 are performed by the interrupt programmer 225 of FIG. 2.

Referring to FIG. 4, at block 405 of method 400, a first processor receives a device interrupt for a device. The device interrupt is received from the device or from an interrupt controller. At block 410, the first processor determines whether a virtual processor that controls the device runs on the first processor. If the virtual processor runs on the first processor, the method continues to block 430. If the virtual processor runs on a different processor, the method continues to block 415.

At block 415, the first processor generates in inter-processor interrupt (IPI). At block 420, the first processor forwards the interrupt to a second processor via the IPI, wherein the virtual processor runs on the second processor. At block 425, processing logic detects the IPI and modifies the device and/or interrupt controller to cause the device and/or interrupt controller to send future device interrupts for the device to the second processor. At block 430, the first processor or the second processor (as appropriate) sends the device interrupt to the virtual processor.

Figure 5:
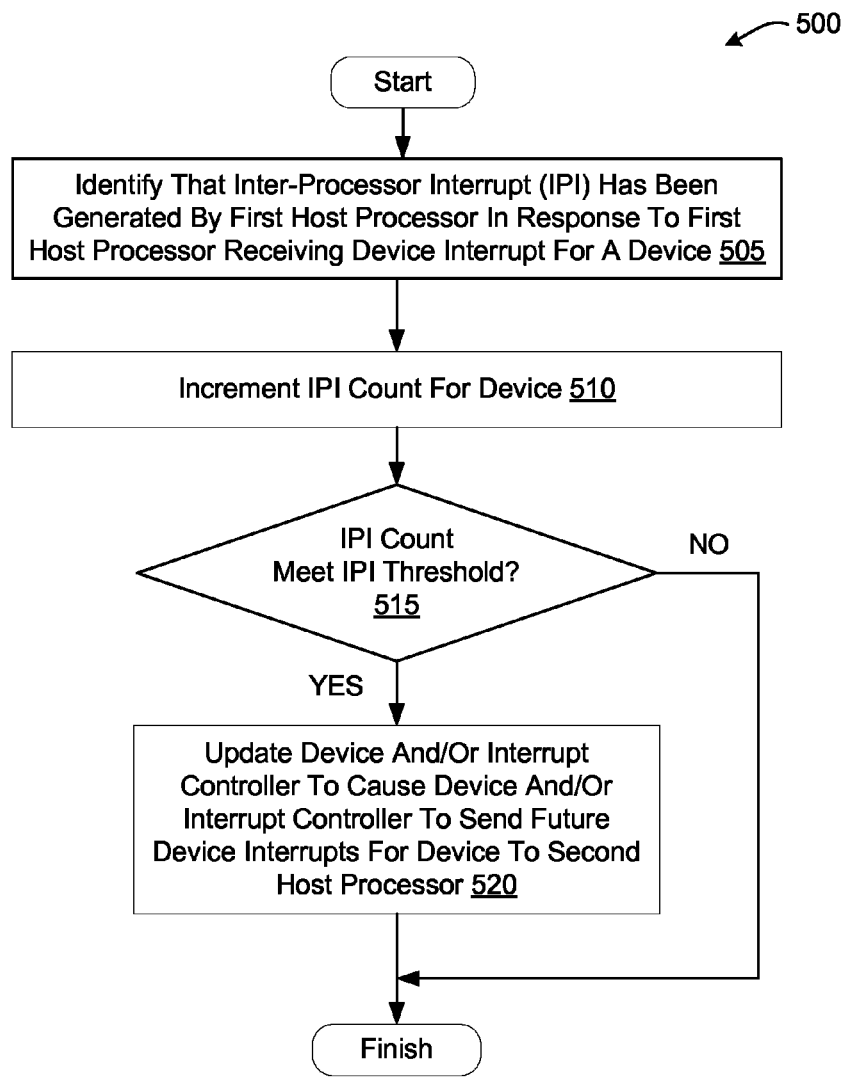
FIG. 5 is a flow diagram illustrating another embodiment of a method for performing pessimistic mapping of device interrupts to processors.

FIG. 5 is a flow diagram illustrating another embodiment of a method 500 for performing pessimistic mapping of device interrupts to processors. The method 500 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 500 is performed by the interrupt programmer 225 of FIG. 2.

Referring to FIG. 5, at block 505 of method 500, processing logic identifies that an IPI has been generated by a first host processor. The first host processor may have generated the IPI in response to receiving a device interrupt for a device. The device interrupt may have been received from an interrupt controller or directly from the device. The first host processor forwards the device interrupt to a second host processor via the IPI, wherein a virtual processor that controls the device runs on the second host processor.

At block 510, processing logic increments an IPI count for the device. At block 515, processing logic determines whether the IPI count satisfies an IPI threshold. The IPI threshold may be an absolute threshold, a frequency based threshold, etc. If the IPI count satisfies the IPI threshold, the method continues to block 520. Otherwise, the method ends.

At block 520, processing logic updates the device and/or the interrupt controller to cause the device and/or interrupt controller to send future device interrupts to the second host processor on which the virtual processor runs.

Figure 6:
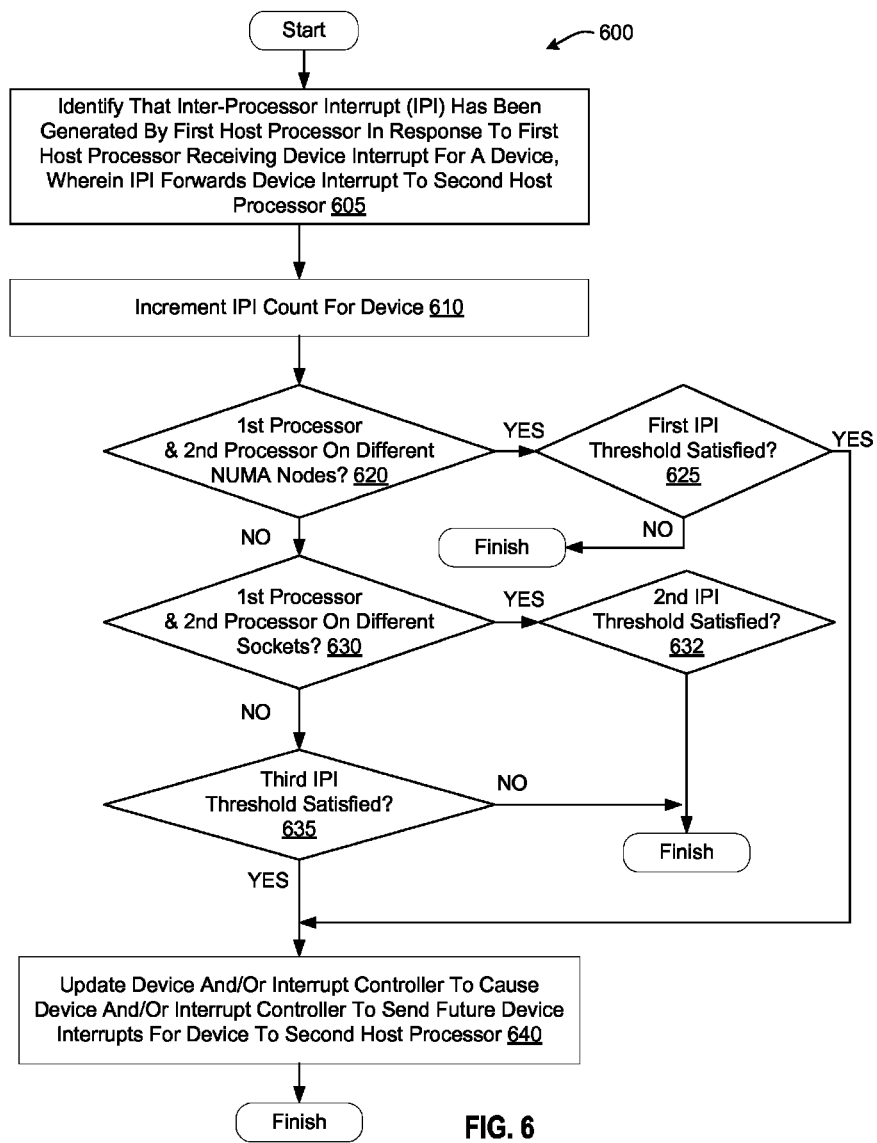
FIG. 6 is a flow diagram illustrating yet another embodiment for a method of performing pessimistic mapping of device interrupts to processors.

FIG. 6 is a flow diagram illustrating yet another embodiment for a method 600 of performing pessimistic mapping of device interrupts to processors. The method 600 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 600 is performed by the interrupt programmer 225 of FIG. 2.

Referring to FIG. 6, at block 605 of method 600, processing logic identifies that an IPI has been generated by a first host processor. The first host processor may have generated the IPI in response to receiving a device interrupt for a device. The device interrupt may have been received from an interrupt controller or directly from the device. The first host processor forwards the device interrupt to a second host processor via the IPI, wherein a virtual processor that controls the device runs on the second host processor.

At block 610, processing logic increments an IPI count for the device. At block 620, the processing logic determines whether the first host processor is on a different NUMA node than the second host processor. If the first processor is on a different NUMA node than the second processor, the method continues to block 625. If the first host processor and the second host processor share a NUMA node, the method continues to block 630.

At block 625, processing logic determines whether a first IPI threshold is satisfied. Communications between processors that are on different NUMA nodes are less efficient than communications between processors that share a NUMA node. Accordingly, the first IPI threshold may be a low threshold. For example, the first IPI threshold may be a single IPI. If the first IPI threshold is satisfied, the method continues to block 640. Otherwise, the method ends.

At block 630, processing logic determines whether the first host processor is on a different socket than the second host processor. This may be the case, for example, if the first processor and the second processor are two different cores of a multi-core processing device. If the first processor is on a different socket than the second processor, the method continues to block 632. If the first processor and the second processor share a socket, the method continues to block 635.

At block 632, processing logic determines whether a second IPI threshold is satisfied. Communications between processors that are on different sockets (but that share a NUMA node) are less efficient than communications between processors that share a socket, but are more efficient than communications between processors on different NUMA nodes. Accordingly, the second IPI threshold may be a higher threshold than the first IPI threshold. For example, the second IPI threshold may be a two IPIs. If the second IPI threshold is satisfied, the method continues to block 640. Otherwise, the method ends.

At block 635, processing logic determines whether a third IPI threshold is satisfied. The third IPI threshold may be a higher threshold than both the first IPI threshold and the second IPI threshold. For example, the third IPI threshold may be a four IPIs. If the second IPI threshold is satisfied, the method continues to block 640. Otherwise, the method ends.

At block 640, processing logic updates the device and/or the interrupt controller to cause the device and/or interrupt controller to send future device interrupts to the second host processor on which the virtual processor runs.

Figure 7:
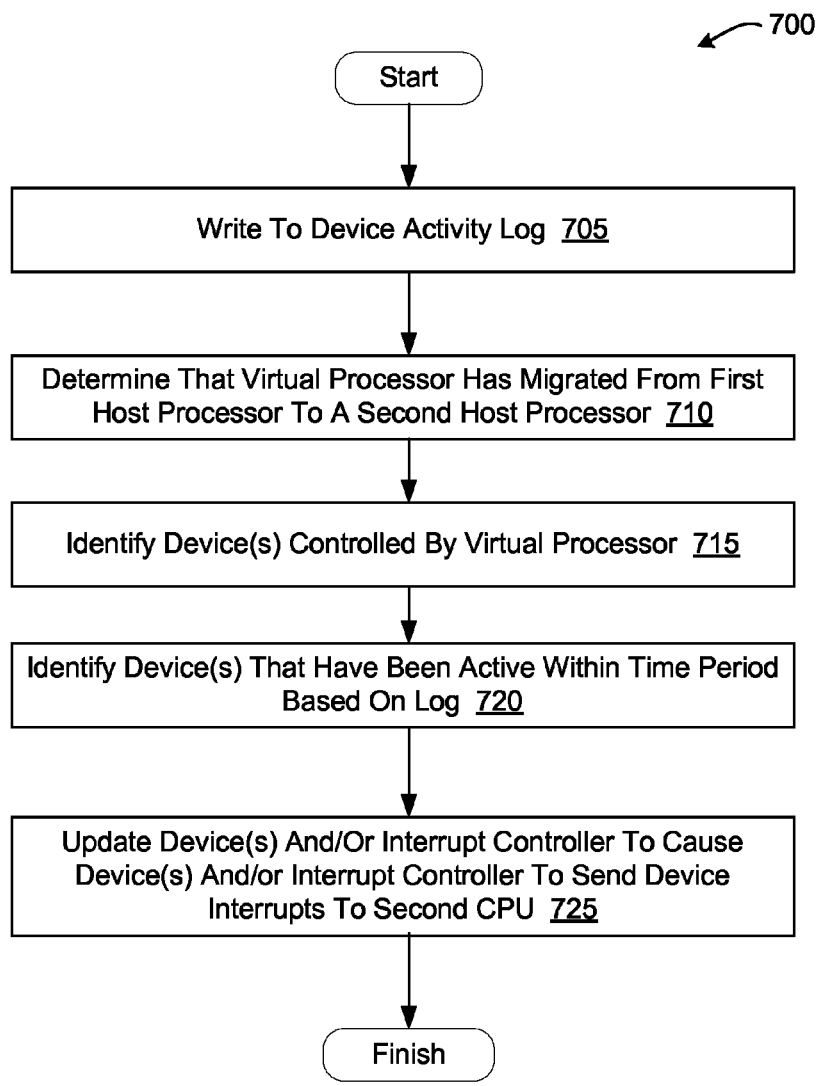
FIG. 7 is a flow diagram illustrating one embodiment for a method of performing optimistic mapping of device interrupts to processors.

FIG. 7 is a flow diagram illustrating one embodiment for a method 700 of performing optimistic mapping of device interrupts to processors. The method 700 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 700 is performed by the interrupt programmer 225 of FIG. 2.

Referring to FIG. 7, at block 705 of method 700, processing logic writes to a device activity log as interrupts are received for devices. At block 710, processing logic determines that a virtual processor has migrated from a first host processor to a second host processor. At block 715, processing logic identifies one or more devices that are controlled by the virtual processor. In one embodiment, at block 720, processing logic identifies devices that have been active within a particular time period based on the activity log. At block 725, processing logic may then update the devices that have been active to cause the devices to send device interrupts to the second host processor (bypassing block 720). Processing logic may also update an interrupt controller to cause the interrupt controller to send device interrupts for these devices to the second host processor. Alternatively, processing logic may update the interrupt controller and/or devices controlled by the virtual processor to cause device interrupts for all devices controlled by the virtual processor to be second to the second host processor. The method then ends.

Figure 8:
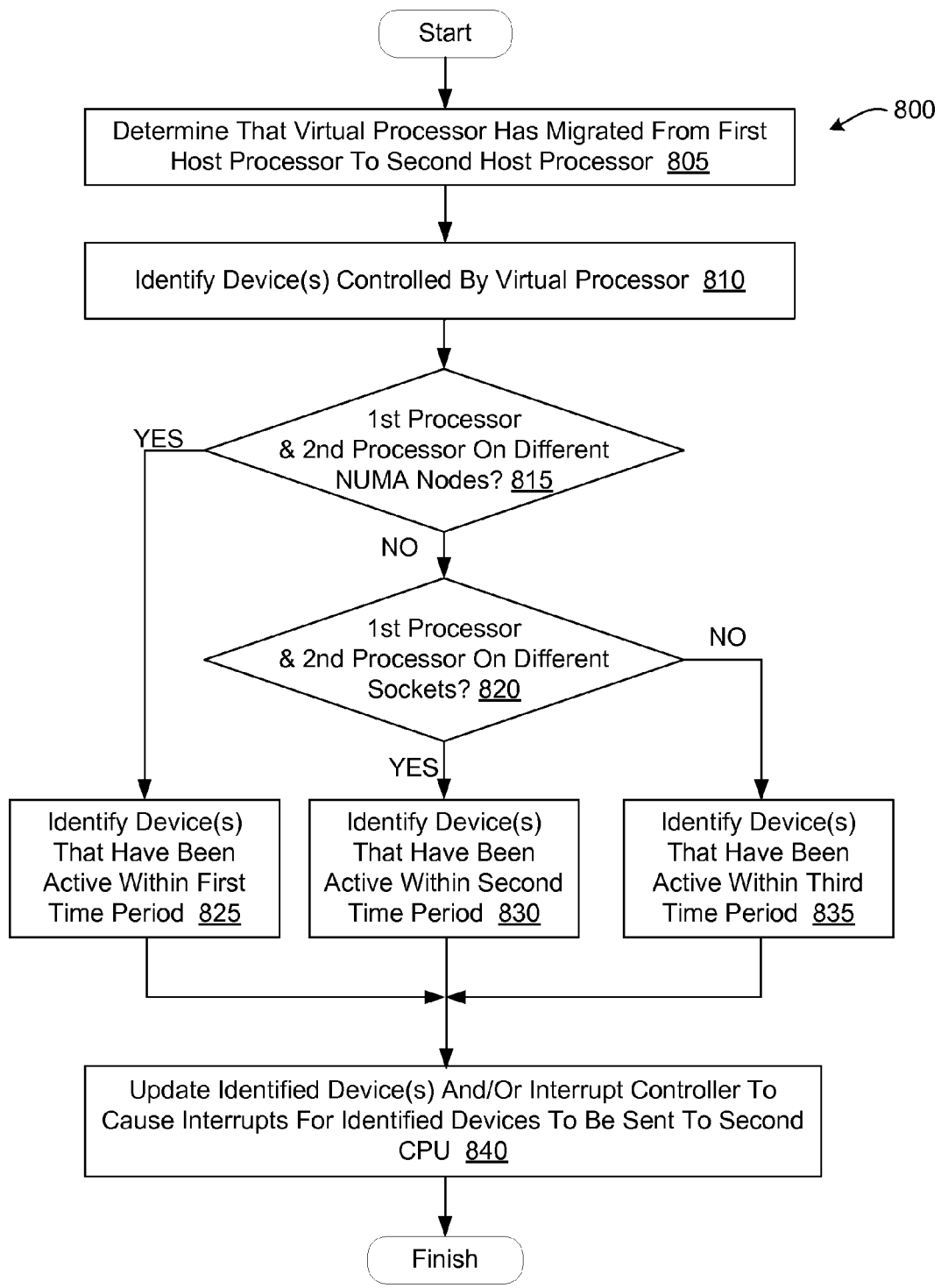
FIG. 8 is a flow diagram illustrating another embodiment for a method of performing optimistic mapping of device interrupts to processors.

FIG. 8 is a flow diagram illustrating another embodiment for a method 800 of performing optimistic mapping of device interrupts to processors. The method 800 may be performed by a computer system that may comprise hardware (e.g., circuitry, dedicated logic, programmable logic, microcode, etc.), software (e.g., instructions run on a processing device to perform hardware simulation), or a combination thereof. In one embodiment, the method 800 is performed by the interrupt programmer 225 of FIG. 2.

Referring to FIG. 8, at block 805 of method 800, processing logic determines that a virtual processor has migrated from a first host processor to a second host processor. At block 810, processing logic identifies one or more devices that are controlled by the virtual processor. At block 815, processing logic determines whether the first processor and the second processor are on different NUMA nodes. If the host processors are on different NUMA nodes, the method continues to block 825. If the processors are not on different NUMA nodes, the method continues to block 820.

At block 820, processing logic determines whether the first processor and the second processor are on different sockets. If the first processor and the second processor are on different sockets, the method continues to block 830. If the first processor and second processor are on the same socket, the method continues to block 835.

At block 825, processing logic identifies devices that have been active within a first time period. At block 830, processing logic identifies devices that have been active within a second time period. At block 835, processing logic identifies devices that have been active within a third time period. The first time period may be shorter than the second time period, which may in turn be shorter than the third time period. For example, the first time period may be the last 5 seconds, the second time period may be the last 10 seconds, and the third time period may be the last 20 seconds.

At block 840, processing logic updates an interrupt controller and/or devices so that interrupts for those devices that have been active within an appropriate time period will send device interrupts to the second host processor. The method then ends.

Note that embodiments of the present invention have been described with reference to device interrupt management for virtual machines. However, embodiments of the present invention may additionally apply to systems that do not include virtual machines. For example, embodiments of the present invention may apply to non-virtualized systems that include traditional application threads that are assigned to specific processors. Accordingly, the above described operations and functions that are described with reference to virtual processors that run on processors may be modified to apply to application threads that run on processors. For example, in such embodiments, an application thread that controls a device may run on a first processor. However, an interrupt controller or device may send interrupts for the device to a second processor. That second processor may then generate an IPI or other inter-processor communication to forward the device interrupt to the first processor. In one embodiment, the second processor generates a software interrupt and sends the software interrupt to the first processor. As described in the embodiments above, an interrupt programmer may modify the device or interrupt controller to cause the device or interrupt controller to send interrupts for the device to the first processor. As with the virtualized systems, this can reduce an overhead associated with communications between processors.

In one embodiment, to handle the processing of a device interrupt (which may be a hardware interrupt) within an operating system (OS), the device interrupt causes a software interrupt within the operating system. The software interrupt may contain a packet of information that was included in or associated with the device interrupt. The packet of information may include information that the OS uses to identify an application thread that is to be notified of the software interrupt. The OS or an interrupt handler may maintain a data structure that associates software interrupts and/or deferred procedure calls (DPCs) with application threads, and/or that associates software interrupts and/or DPCs with hardware interrupts, processors that received the hardware interrupts, and/or devices that generate the hardware interrupts. If a software interrupt (or DPC) triggers a subsequent software interrupt, information regarding the triggered software interrupt may also be added to the data structure. This data structure may be used by an interrupt programmer along with information identifying which application threads run on which processors to reprogram the devices and/or the interrupt controller. In one embodiment, the interrupt programmer updates the devices and/or the interrupt controller after one or more inter-processor communication thresholds are exceeded. The inter-processor communication thresholds may be based on inter-processor interrupt counts, or based on counts of other types of inter-processor communications (e.g., involving software interrupts). In another embodiment, the interrupt programmer updates the devices and/or interrupt controller in response to an application thread being migrated to a new processor.

Figure 9:
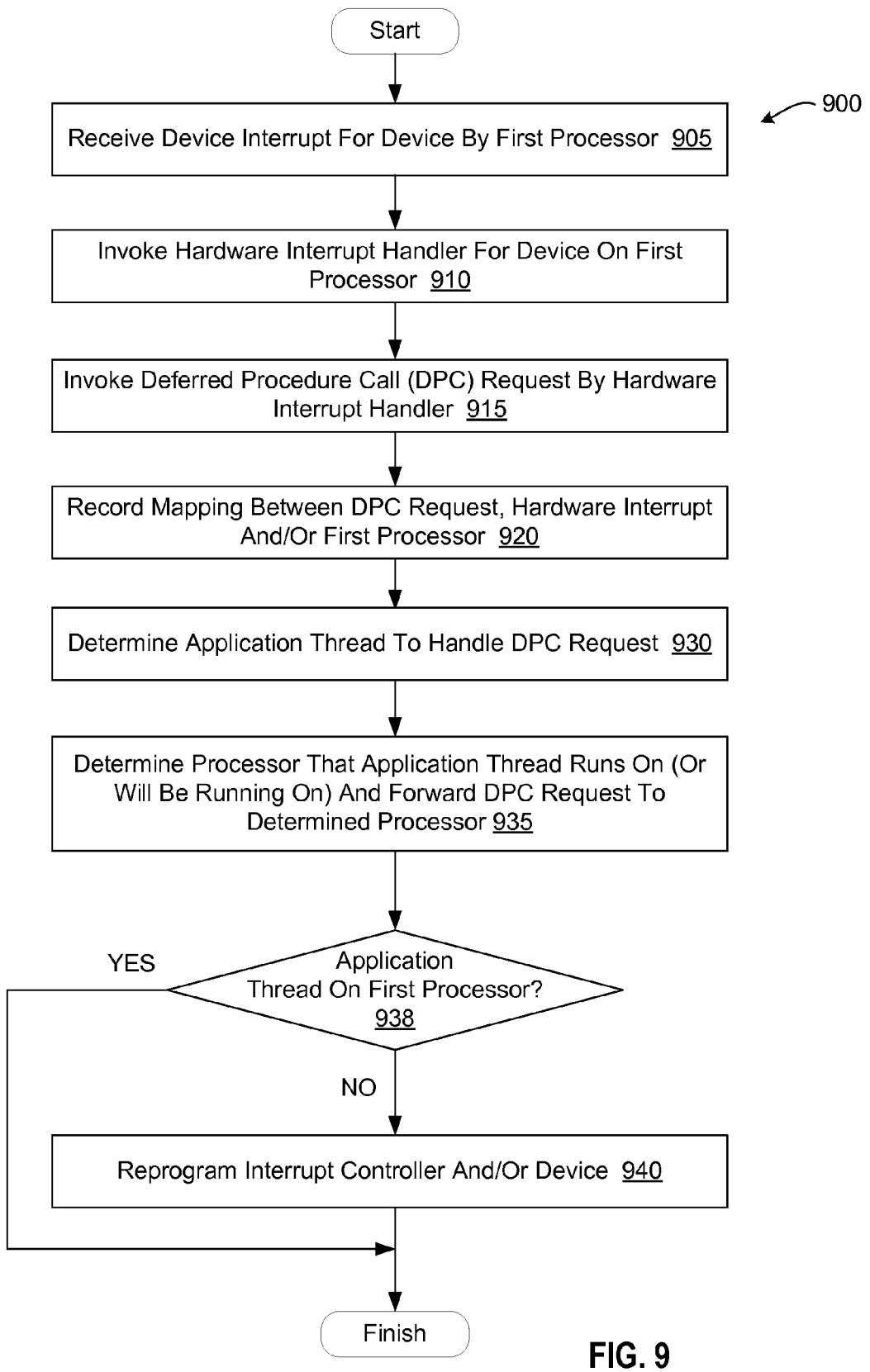
FIG. 9 is a flow diagram illustrating one embodiment for a method of performing pessimistic mapping of device interrupts to processors in a non-virtual environment.

FIG. 9 is a flow diagram illustrating one embodiment for a method 900 of performing pessimistic mapping of device interrupts to processors in a non-virtual environment. The method 900 may be performed by a computer system that may comprise hardware (e.g., circuitry, dedicated logic, programmable logic, microcode, etc.), software (e.g., instructions run on a processing device to perform hardware simulation), or a combination thereof. In one embodiment, at least some operations of the method 900 are performed by the interrupt programmer 225 of FIG. 2.

Referring to FIG. 9 at block 905 of method 900, a first processor receives a device interrupt (which is a hardware interrupt) from a hardware device. At block 910, processing logic invokes a hardware interrupt handler for the device interrupt on the first processor. At block 915, the hardware interrupt handler invokes a deferred procedure call (DPC) request, which may cause a software interrupt to be generated for the DPC request and/or may be associated with a software interrupt. The software interrupt may be executed on the first processor or on a different processor. At block 920, processing logic records a mapping from the DPC request to the hardware interrupt, and may further record the first processor in the mapping.

At block 930, processing logic determines an application thread to handle the DPC request. The processing logic then determines a processor that the application thread runs on (or will be running on) at block 935. This may be accomplished by examining a table maintained by an OS that maps application threads to processors. Subsequently, processing logic forwards the DPC to the determined processor.

At block 938, processing logic compares the processor that generated the DPC (first processor) to the processor on which the application thread runs. If these processors are the same, the method ends. If these processors are different, the method continues to block 940, and processing logic finds the hardware interrupt that caused the software interrupt to be generated (e.g., from the recorded mapping). Processing logic then reprograms the interrupt controller and/or the device that generated the hardware interrupt to cause the device or interrupt controller to send future hardware interrupts to the processor on which the application thread runs (e.g., to a second processor). The method then ends.

Figure 10:
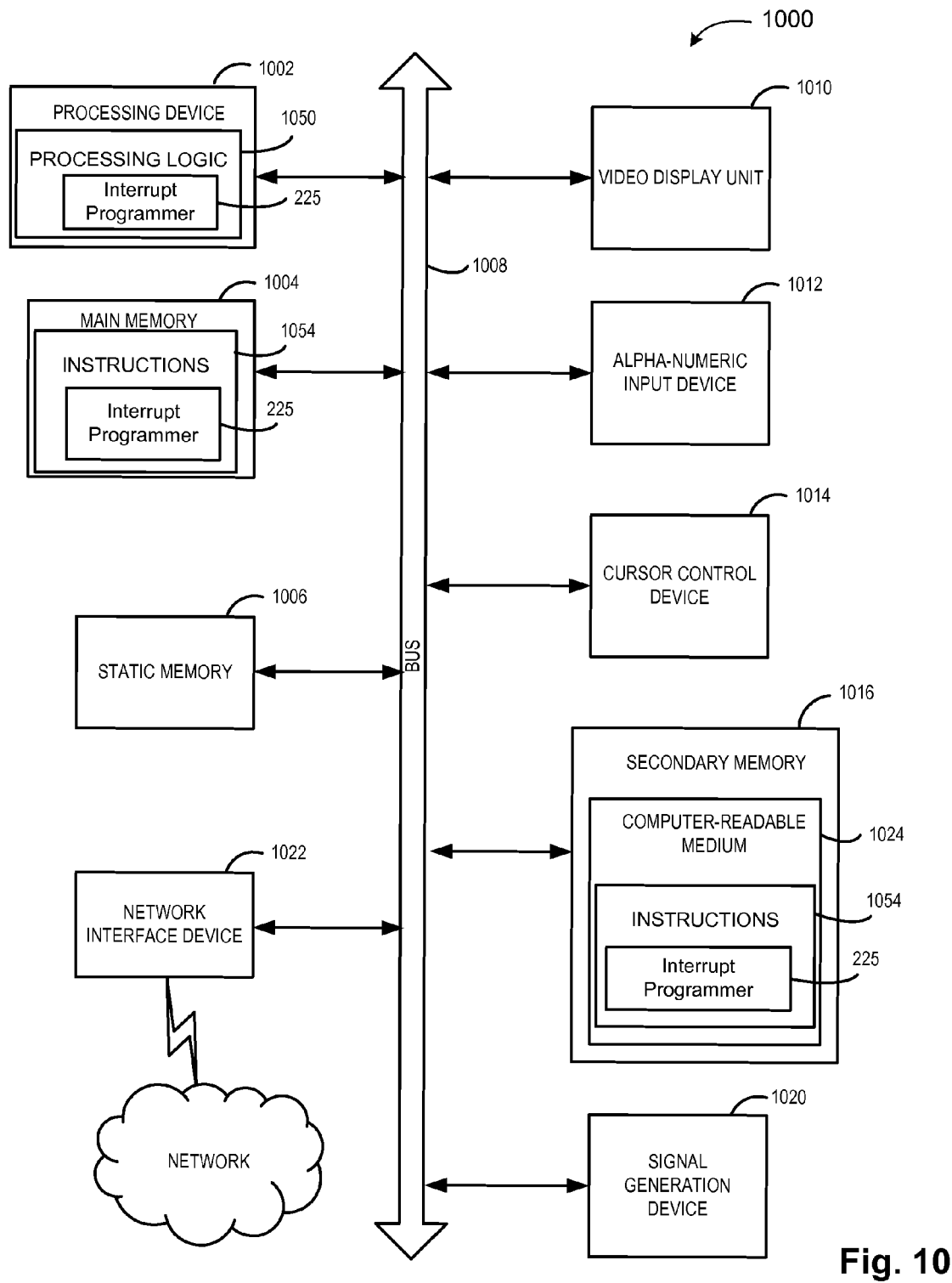
FIG. 10 illustrates a diagrammatic representation of a machine in the exemplary form of a computer system.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device), which communicate with each other via a bus 1008.

The processing device 1002 represents one or more general-purpose processing devices such as a microprocessor, central processing unit, or the like. The processing device may include multiple processors. The processing device 1002 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions 1054 embodying any one or more of the methodologies or functions described herein (e.g., interrupt programmer 225). The instructions 1054 may also reside, completely or at least partially, within the main memory 1004 and/or within the processing device 1002 during execution thereof by the computer system 1000; the main memory 1004 and the processing device 1002 also constituting machine-readable storage media.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The computer system 1000 may additionally include an interrupt programming module (not shown) for implementing the functionalities of the interrupt programmer. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices.

Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "updating", "identifying", "determining", "sending", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

identifying that a first physical processor has forwarded information regarding a device interrupt for a device to a second physical processor executing at least one of a virtual processor that controls the device or an application thread that controls the device; and after identifying that the first physical processor has forwarded the information regarding the device interrupt to the second physical processor and in response to determining that one or more update criteria have been satisfied, updating, by a processing device, at least one of the device or an interrupt controller to cause at least one of the device or the interrupt controller to send future device interrupts for the device to the second physical processor.

2. The method of claim 1, wherein identifying that the first physical processor has forwarded the information regarding the device interrupt to the second physical processor comprises detecting an inter-processor interrupt that was generated by the first physical processor in response to the first physical processor receiving the device interrupt.

3. The method of claim 2, wherein the one or more update criteria comprise an interprocessor interrupt threshold, the method further comprising:

determining whether a number of inter-processor interrupts that have been generated based on device interrupts for the device meet or exceed the inter-processor interrupt threshold; and updating at least one of the device or the interrupt controller in response to determining that the number of inter-processor interrupts that have been generated based on device interrupts for the device meet or exceed the inter-processor interrupt threshold.

4. The method of claim 1, wherein the first physical processor is a component of a first NUMA node, and wherein the one or more update criteria comprise a NUMA node criterion, the method further comprising:

determining whether the second physical processor is also a component of the first NUMA node; and in response to determining that the second physical processor is not a component of the first NUMA node, updating at least one of the device or the interrupt controller.

5. The method of claim 1, wherein the first physical processor is a component of a first socket, and wherein the one or more update criteria comprise a socket criterion, the method further comprising:

determining whether the second physical processor is also a component of the first socket; and in response to determining that the second physical processor is not a component of the first socket, updating at least one of the device or the interrupt controller.

6. The method of claim 1, wherein the one or more update criteria comprise a first inter-processor communication threshold and a second inter-processor communication threshold, the method further comprising:

in response to determining that the first physical processor and the second physical processor are components of different NUMA nodes and that the first inter-processor communication threshold is satisfied, updating at least one of the device or the interrupt controller to cause the device or the interrupt controller to send future device interrupts for the device to the second physical processor; and in response to determining that the first physical processor and the second physical processor are components of different sockets and that the second inter-processor communication threshold is satisfied, updating at least one of the device or the interrupt controller to cause the device or the interrupt controller to send future device interrupts for the device to the second physical processor.

7. The method of claim 1, wherein identifying that the first physical processor has forwarded the information regarding the device interrupt to the second physical processor comprises:

determining that a deferred procedure call (DPC) request was generated by the first physical processor after the first physical processor received the device interrupt; and determining that the DPC request was processed by the second physical processor executing the application thread.

8. A non-transitory computer readable storage medium including instructions that, when executed by a computing device, cause the computing device to perform operations comprising:

identifying that a first physical processor has forwarded information regarding a device interrupt for a device to a second physical processor executing at least one of a virtual processor that controls the device or an application thread that controls the device; and after identifying that the first physical processor has forwarded the information regarding the device interrupt to the second physical processor and in response to determining that one or more update criteria have been satisfied, updating, by a processing device, at least one of the device or an interrupt controller to cause at least one of the device or the interrupt controller to send future device interrupts for the device to the second physical processor.

9. The non-transitory computer readable storage medium of claim 8, wherein identifying that the first physical processor has forwarded the information regarding the device interrupt to the second physical processor comprises detecting an inter-processor interrupt that was generated by the first physical processor in response to the first physical processor receiving the device interrupt.

10. The non-transitory computer readable storage medium of claim 9, wherein the one or more update criteria comprise an inter-processor interrupt threshold, the operations further comprising:

determining whether a number of inter-processor interrupts that have been generated based on device interrupts for the device meet or exceed the inter-processor interrupt threshold; and updating at least one of the device or the interrupt controller in response to determining that the number of inter-processor interrupts that have been generated based on device interrupts for the device meet or exceed the inter-processor interrupt threshold.

11. The non-transitory computer readable storage medium of claim 8, wherein the first physical processor is a component of a first NUMA node, and wherein the one or more update criteria comprise a NUMA node criterion, the operations further comprising:

determining whether the second physical processor is also a component of the first NUMA node; and in response to determining that the second physical processor is not a component of the first NUMA node, updating at least one of the device or the interrupt controller.

12. The non-transitory computer readable storage medium of claim 8, wherein the first physical processor is a component of a first socket, and wherein the one or more update criteria comprise a socket criterion, the operations further comprising:

determining whether the second physical processor is also a component of the first socket; and in response to determining that the second physical processor is not a component of the first socket, updating at least one of the device or the interrupt controller.

13. The non-transitory computer readable storage medium of claim 8, wherein the one or more update criteria comprise a first inter-processor communication threshold and a second inter-processor communication threshold, the operations further comprising:

in response to determining that the first physical processor and the second physical processor are components of different NUMA nodes and that the first inter-processor communication threshold is satisfied, updating at least one of the device or the interrupt controller to cause the device or the interrupt controller to send future device interrupts for the device to the second physical processor; and in response to determining that the first physical processor and the second physical processor are components of different sockets and that the second inter-processor communication threshold is satisfied, updating at least one of the device or the interrupt controller to cause the device or the interrupt controller to send future device interrupts for the device to the second physical processor.

14. The non-transitory computer readable storage medium of claim 8, wherein identifying that the first physical processor has forwarded the information regarding the device interrupt to the second physical processor comprises:

determining that a deferred procedure call (DPC) request was generated by the first physical processor after the first physical processor received the device interrupt; and determining that the DPC request was processed by the second physical processor executing the application thread.

15. A computing apparatus comprising:
a device, to generate device interrupts; and
a processing device, coupled to the device, comprising:
a first physical processor; and
a second physical processor, to execute at least one of a virtual processor that controls the device or an application thread that controls the device;
wherein the processing device executes instructions that cause the processing device to:
identify that the first physical processor has forwarded information regarding a device interrupt for the device to the second physical processor; and
after identifying that the first physical processor has forwarded the information regarding the device interrupt to the second physical processor and in response to determining that one or more update criteria have been satisfied, update at least one of the device or an interrupt controller to cause at least one of the device or the interrupt controller to send future device interrupts for the device to the second physical processor.

16. The computing apparatus of claim 15, wherein identifying that the first physical processor has forwarded the information regarding the device interrupt to the second physical processor comprises detecting an inter-processor interrupt that was generated by the first physical processor in response to the first physical processor receiving the device interrupt.

17. The computing apparatus of claim 16, wherein the one or more update criteria comprise an inter-processor interrupt threshold, and wherein the instructions further cause the processing device to:
    determine whether a number of inter-processor interrupts that have been generated based on device interrupts for the device meet or exceed the inter-processor interrupt threshold; and
    update at least one of the device or the interrupt controller in response to determining that the number of inter-processor interrupts that have been generated based on device interrupts for the device meet or exceed the inter-processor interrupt threshold.

18. The computing apparatus of claim 15, wherein the first physical processor is a component of a first NUMA node, and wherein the one or more update criteria comprise a NUMA node criterion, the instructions further to cause the processing device to:
    determine whether the second physical processor is also a component of the first NUMA node; and
    in response to determining that the second physical processor is not a component of the first NUMA node, update at least one of the device or the interrupt controller.

19. The computing apparatus of claim 15, wherein the first physical processor is a component of a first socket, and wherein the one or more update criteria comprise a socket criterion, the instructions further to cause the processing device to:
    determine whether the second physical processor is also a component of the first socket; and
    in response to determining that the second physical processor is not a component of the first socket, update at least one of the device or the interrupt controller.

20. The computing apparatus of claim 19, wherein the one or more update criteria comprise a first inter-processor communication threshold and a second inter-processor communication threshold, the instructions further to cause the processing device to:
    in response to determining that the first physical processor and the second physical processor are components of different NUMA nodes and that the first inter-processor communication threshold is satisfied, update at least one of the device or the interrupt controller to cause the device or the interrupt controller to send future device interrupts for the device to the second physical processor; and
    in response to determining that the first physical processor and the second physical processor are components of different sockets and that the second inter-processor communication threshold is satisfied, update at least one of the device or the interrupt controller to cause the device or the interrupt controller to send future device interrupts for the device to the second physical processor;
    wherein the first inter-processor communication threshold is satisfied if a number of inter-processor communications generated based on device interrupts for the device meets or exceeds the first inter-processor communication threshold, wherein the second inter-processor communication threshold is satisfied if the number of inter-processor communications generated based on device interrupts for the device meets or exceeds the second inter-processor communication threshold, and wherein the first inter-processor communication threshold is lower than the second inter-processor communication threshold.

21. The computing apparatus of claim 15, wherein identifying that the first physical processor has forwarded the information regarding the device interrupt to the second physical processor comprises:
    determining that a deferred procedure call (DPC) request was generated by the first physical processor after the first physical processor received the device interrupt; and
    determining that the DPC request was processed by the second physical processor executing the application thread.

22. The computing apparatus of claim 15, wherein the information regarding the device interrupt comprises the device interrupt.

* * * * *